(12) United States Patent
Whiting

(10) Patent No.: US 10,710,095 B2
(45) Date of Patent: *Jul. 14, 2020

(54) APPARATUS AND METHOD TO RENDER AIR BAG INFLATORS AND OTHER LOW LEVEL DETONATABLE DEVICES INERT FOR RECYCLING

(71) Applicant: Clean Harbors Environmental Services, Inc., Norwell, MA (US)

(72) Inventor: Paul T. Whiting, Gilford, NH (US)

(73) Assignee: Clean Harbors Environmental Services, Inc., Norwell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,403

(22) Filed: Mar. 5, 2019

(65) Prior Publication Data

US 2019/0210035 A1 Jul. 11, 2019

Related U.S. Application Data

(63) Continuation-in-part of application No. 16/033,336, filed on Jul. 12, 2018, now Pat. No. 10,330,452.

(60) Provisional application No. 62/532,724, filed on Jul. 14, 2017.

(51) Int. Cl.

| | |
|---|---|
| B02C 23/18 | (2006.01) |
| B02C 19/00 | (2006.01) |
| B02C 23/08 | (2006.01) |
| B02C 23/04 | (2006.01) |
| B09B 3/00 | (2006.01) |
| F42B 33/06 | (2006.01) |
| B09B 5/00 | (2006.01) |
| B02C 23/02 | (2006.01) |
| C06B 21/00 | (2006.01) |
| B02C 18/14 | (2006.01) |

(52) U.S. Cl.
CPC .......... B02C 23/18 (2013.01); B02C 19/0056 (2013.01); B02C 23/04 (2013.01); B02C 23/08 (2013.01); B09B 3/0058 (2013.01); B09B 5/00 (2013.01); F42B 33/06 (2013.01); B02C 23/02 (2013.01); B02C 2018/147 (2013.01); B09B 2220/02 (2013.01); C06B 21/0091 (2013.01)

(58) Field of Classification Search
CPC .................................. F42D 5/04; F42B 33/06
See application file for complete search history.

(56) References Cited

U.S. PATENT DOCUMENTS

| | | |
|---|---|---|
| 3,906,874 A | 9/1975 | Jaronko et al. |
| 4,332,478 A * | 6/1982 | Binz .................... B09B 5/00 366/25 |
| 4,378,851 A | 4/1983 | deVries |
| 5,294,244 A | 3/1994 | Allerton, III et al. |

(Continued)

Primary Examiner — Bret Hayes
(74) Attorney, Agent, or Firm — Davis Malm & D'Agostine, P.C.; Richard L. Sampson

(57) ABSTRACT

Detonable devices such as charged air bag inflators are fed to a shred tower at a controlled feed rate via a feed valve. Water spray and/or water baths in the shred tower prevent sparking and begin to solubilize chemicals while the inflators are fed to primary and optional secondary shredders respectively performing course and fine shreds. A sump receives the shredded material which continues solubilize and separate chemicals from metal. A conveyor lifts solids from the sump. Dewatered solids are fed to a receiving box for metal scrap recycling.

39 Claims, 2 Drawing Sheets

(56) References Cited

U.S. PATENT DOCUMENTS

| | | | |
|---|---|---|---|
| 5,578,110 A | 11/1996 | Nakasato et al. | |
| 5,730,072 A | 3/1998 | Wright et al. | |
| 5,849,062 A | 12/1998 | Fukabori et al. | |
| 7,700,047 B2 * | 4/2010 | Quimby | F42B 33/067 110/235 |
| 10,330,452 B2 * | 6/2019 | Whiting | B02C 23/02 |
| 2005/0228694 A1 | 10/2005 | Firestone, III et al. | |
| 2009/0103942 A1 | 4/2009 | Lamphere et al. | |
| 2011/0101137 A1 | 5/2011 | Langston | |
| 2011/0165035 A1 | 7/2011 | Lewis et al. | |
| 2013/0186573 A1 | 7/2013 | Kulesa et al. | |
| 2014/0048631 A1 | 2/2014 | Kulesa | |

* cited by examiner

US 10,710,095 B2

APPARATUS AND METHOD TO RENDER AIR BAG INFLATORS AND OTHER LOW LEVEL DETONATABLE DEVICES INERT FOR RECYCLING

RELATED APPLICATION

This application is a Continuation-In-Part of U.S. patent application Ser. No. 16/033,336 entitled Apparatus and Method to Render Air Bag Inflators and other Low Level Detonatable Devices Inert for Recycling, filed on Jul. 12, 2018, which claims the benefit of U.S. Provisional Patent Application Ser. No. 62/532,724, entitled Apparatus and Method to Render Air Bag Inflators and other Low Level Detonatable Devices Inert for Recycling, filed on Jul. 14, 2018, the contents all of which are incorporated herein by reference in their entirety for all purposes.

BACKGROUND

Technical Field

This invention relates to metal and chemical recycling, and more particularly to an automated system for rendering air bag inflators and other low level detonatable devices inert for recycling.

Background Information

Air bag units for automobiles are widely used throughout the world. They are installed to protect passengers during a crash. Generally, an air bag unit comprises an air bag and an inflator therefor. Upon impact the inflator is actuated and releases gas to rapidly expand the air bag. The inflated air bag forms a cushion between the passenger and, for example, the steering wheel to prevent the passenger from impacting against the steering wheel as the automobile rapidly decelerates.

The inflator has a metallic housing. A gas generant, e.g., in the form of a chemical explosive propellant, is disposed in the housing along with an ignition means for igniting the propellant. The ignition means may be actuated by mechanical shock or by electrical signals generated by suitable sensors.

Typically the housing for an air bag inflator is made of, for example, carbon steel, aluminum alloy and stainless steel. The propellant may have primary components such as $NH_4NO_3$ (ammonium nitrate).

When automobiles are scrapped, they are usually compressed. If an automobile is compressed with an unused air bag unit therein, there is the risk that the air bag unit will explode. In order to avoid this risk, the scrapping process is carried out only after actuation of the air bag inflator. The following disposal instructions may be provided to effect actuation:

1. For electric air bag inflators a prescribed current is applied by wires leading from a battery to actuate the inflator. This may be accomplished either with the device in the car or may be accomplished by removing, for example, the steering wheel from the car.
2. For mechanical air bag inflators the inflator is removed from the car, placed within scrapped or used tires and then mechanically actuated.

While conventional approaches may be suitable for processing small numbers of air bag inflators, a need exists for an automated system and method for efficiently rendering large quantities of air bag inflators and other low level detonatable devices inert for recycling, such as to provide manufacturers and automotive scrapping operations with the option of shipping undeployed inflators to a third party for safe destruction and recycling.

SUMMARY

The appended claims may serve as a summary of the invention.

The features and advantages described herein are not all-inclusive and various embodiments may include some, none, or all of the enumerated advantages. Additionally, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
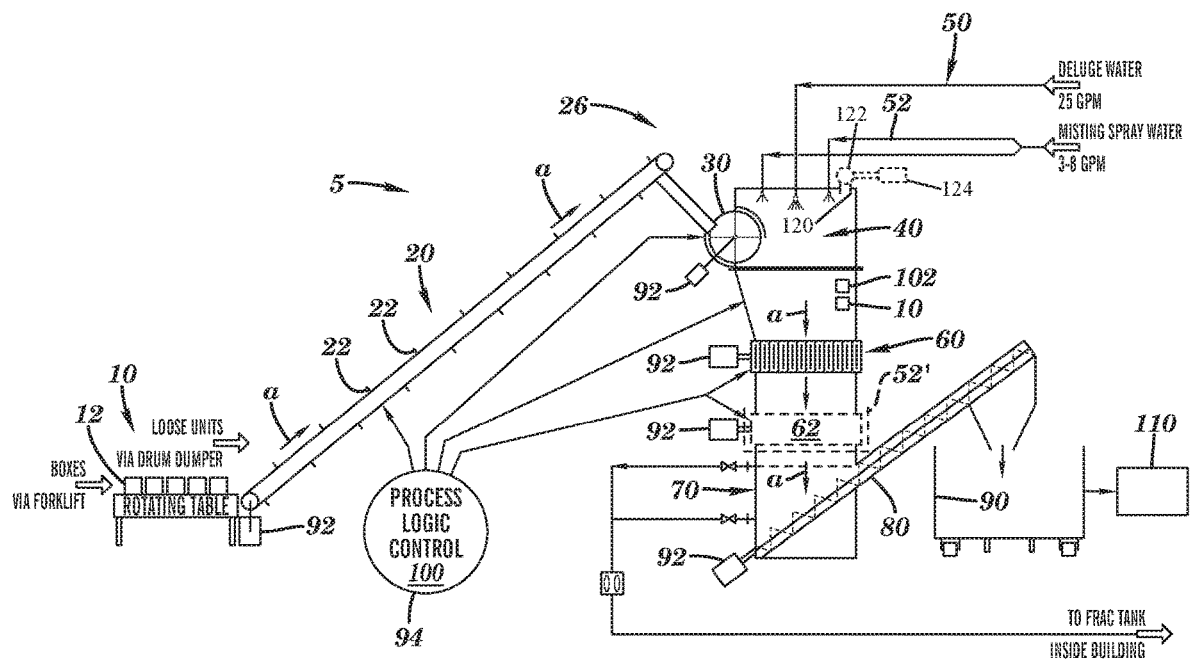
FIG. 1 is a schematic representation of an embodiment of the present invention, including optional variations thereof.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

The present inventor has recognized that in order to recycle as scrap certain devices that may or may not be deemed hazardous, such as according to one or both of DOT (U.S. Department of Transportation) or RCRA (Resource Conservation Recovery Act 1976) any chemicals must be separated from the metal or plastics which are to be recycled. The present inventor has also recognized that in many instances it would be inadvisable to batch feed detonable materials directly into a kiln or oven which is not designed to contain deflagrations or detonations. The inventor further recognized that conventional shredding approaches would be inappropriate for charged detonable devices due to the potential for dangerous detonations and inadequate separation of active chemicals from shredded materials (e.g., metals).

The embodiments shown and described herein address these issues by shredding charged detonable devices, e.g., charged air bag inflators, in a continuous process within a special chamber while in contact with water, e.g., via irrigation means such as a water spray/shower or bath, which reduces chances of sparking, eliminates heat buildup and begins to react (hydrolyze) and dissolve the chemical constituents. In particular embodiments, hydrolysis of the chemical constituents is completed in a water sump from which the solids are then removed with a dewatering screw system. Water used for the hydrolysis is then pumped off for hazardous waste disposal/recycling. Optionally, the scrap content is then further processed in a high temperature kiln or oven to destroy any residue and render the material inert/non-hazardous for scrap recycling.

The present inventor conducted a number of tests on sample devices to help devise and determine the effectiveness of the particular arrangement of elements shown and described herein to adequately render inert various size air bag inflator devices and expose their chemical contents. As discussed in greater detail hereinbelow, particular embodiments are designed for continuously shredding batches of air bag inflators or similarly combustible materials, along with cardboard boxes or other receptacles in which the bulk shipments of air bag inflators may be transported. It should also be noted that the air bag inflators may be shredded along with their associated fabric bag components. Embodiments include a closed chamber with rotary feeder and irrigation means (e.g., water bath or spray as shown) with a low speed dual stacked hydraulic shredder system that opens intact air bag units while being irrigated by the irrigation means (e.g., under the water spray or submerged in a water bath) to provide for hydrolysis of the chemical contents. The material is then fed to a secondary irrigation means, such as the water sump as shown, to complete the hydrolysis of the chemical contents. The metal shards are dewatered/separated from the hydrolysate e.g., using an inclined screw, and then staged in roll off boxes for recycling. The metal scrap is optionally baked in an oven or kiln to destroy any remaining chemical residue prior to recycling. Embodiments are configured to process approximately 80,000 to 180,000 pounds of material per day based on operation 24 hours per day.

Terminology

As used in the specification and in the appended claims, the singular forms "a", "an", and "the" include plural referents unless the context clearly indicates otherwise. Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Where used in this disclosure, the term 'downstream' refers to the direction of flow of the material (e.g., boxes 12) through the apparatus 5, such as indicated by arrows a in FIG. 1. The term 'upstream' refers to a direction other than downstream. When either term 'downstream' or 'upstream' is used with reference to a component of apparatus 5, these terms shall refer to the direction of flow of the material through such component.

Referring now to FIG. 1, embodiments of the present invention include an apparatus 5 for rendering inert and separating components of detonable devices fabricated from metal and water soluble chemical explosive propellants, for recycling. The apparatus includes a raw material feeder 10, such as a conventional sorting table with or without rollers, a bin, and/or a hopper, for receiving material which may include the detonable devices along with related components such as shipping material/boxes as discussed hereinbelow. As mentioned hereinabove, in particular embodiments, the detonable devices are charged air bag inflators with water soluble chemical explosive propellants such as ammonium nitrate, nitroguanidine, and/or combinations thereof, although other propellants may be used. It should also be noted that air bag inflators may be of substantially any form factor, including puck shaped metallic air bag inflators typically used in automobile steering wheels, and cylindrical metallic air bag inflators typically placed on the passenger-side dashboard and elsewhere in the automobile. If the detonable devices are delivered to the apparatus 5 in conventional boxes 12, such as fabricated from cardboard or similar materials used in the shipping industry, such boxes may be placed on feeder 10 (e.g., a table as shown) and fed to conveyor 20. Alternatively, if the detonable devices are delivered loosely in drums instead of in boxes, feeder 10 may take the form of a metering hopper fitted to feed the devices to conveyor 20. It should be recognized that the air bag inflators may be fed to conveyor 20 along with associated components such as the actual air bags the inflators were designed to inflate.

A first conveyor 20, such as an inclined conveyor belt with buckets or cleats 22 as shown, is operatively engaged with a raw material feeder 10, such as a roll table or hopper, to feed, at a controlled feed rate, the material/boxes 12, from the feeder 10 to an upstream portion of a shred tower 26.

Shred tower 26 is configured to convey the material in the downstream direction a therethrough, and includes a hopper 40, a primary shredder 60 disposed within or downstream of the hopper 40, an optional secondary shredder 62, shown in phantom, disposed downstream of the hopper 40, and an optional water sump 70 disposed downstream of the secondary shredder 62. It should be noted that in particular embodiments, hopper 40, as well as portions of shred tower 26 located downstream of the hopper, is fabricated from reinforced metal, e.g., steel plate of sufficient design strength and volume to contain and allow safe venting of gases while containing metal shards within the chamber in the event a detonation of a detonable device occurs during processing. In particular embodiments, the hopper 40 and shred tower 26 is closed in 360 degrees about the downstream direction, during shredding operations to prevent shard/shrapnel release, as discussed in greater detail hereinbelow. Shred tower 26 is vented to atmosphere or to an emissions control device to prevent pressure buildup in the event of a detonation. For example, in particular embodiments, hopper 40 may be provided with a vent 120 which is optionally communicably coupled to an induced draft fan, shown in phantom at 122, which is configured to withdraw gases counter-currently (e.g., in the upstream direction) out of the vent 120. The withdrawn gases are then fed to an emissions control device such as a conventional thermal destruction device or carbon bed, shown in phantom at 124, for proper disposal/air pollution control. The hopper may also include a hinged perforated plate cover (not shown). Moreover, a feed valve 30 is disposed at an upstream portion of the hopper 40, and is selectively actuatable between open and closed positions to respectively permit and prevent the material from entering the hopper from the conveyor 20, e.g., via a drop chute as shown. In particular embodiments, valve 30 is a rotary feed valve, such as a variable speed indexing rotary paddle wheel feeder, which introduces the material into the hopper 40 at a controlled rate. The paddle wheel embodiment operates similarly to a revolving door in an office building to ensure that the valve 30 is effectively closed immediately after each box 12 is fed into the hopper 40, to help prevent shards or shrapnel from escaping during shredding, e.g., should a detonation occur during shredding operations. It should also be recognized that in particular embodiments, the rate of actuation of valve 30 will be coordinated with the speed of the conveyor 20, such as by driving conveyor 20 with a variable speed motor controller by a processor, such as a conventional Programmable Logic Controller (PLC), or with a hydraulic motor drive, as will be discussed in greater detail hereinbelow.

Shred tower 26 is also equipped with an irrigation means, which in particular embodiments includes a set of misting water spray nozzles 50 disposed at an upper portion of hopper 40 to spray water, e.g., continuously, in the hopper towards teeth of the shredder(s). This irrigation helps to prevent sparking and to begin to solubilize, separate, and hydrolyze the chemicals from the during operation of the primary shredder 60 and/or secondary shredder 62. Optionally, the irrigation means may include a water bath, such as shown in phantom lines at 52', within which one or both shredders 60, 62 may be immersed. Particular embodiments may also include one or more deluge water spray nozzles 52 communicably coupled to a flame detector for activation upon detection of a flame. The deluge water spray nozzles 52 are configured to supply a high volume of water, (e.g., 25 gallons per minute or more) relative to the set of misting water spray nozzles 50 (e.g., 3-8 gallons per minute).

Primary shredder 60 is configured to perform a course shred of the material, e.g., using relatively widely pitched teeth, including tearing open the receptacles and releasing the detonable devices, while in particular embodiments, optional secondary shredder 62 is configured to receive the material from the primary shredder, and to perform a fine shred of the material using relatively finely spaced teeth, to open the detonable devices and expose the chemical constituents. In particular embodiments, the primary shredder and optional secondary shredder each includes a 200 HP M100H shredder commercially available from SSI Shredding Systems, Inc. of Wilsonville, Oreg., or a 200 HP shredder available from Komar Industries, Inc. of Columbus, Ohio, with the secondary shredder having finer teeth than the primary shredder.

Water sump 70 is configured to receive and immerse the material from the secondary shredder to continue to solubilize and separate the chemicals from the metal. This tank also allows further hydrolysis activity to occur with any water soluble chemicals. Reagents or other diluents may be added depending on the chemical contents to further propagate destruction. The tank may also include a level control and pumping system to maintain water level. In particular embodiments, the water sump 70 has a capacity of at least about 500 gallons up to about 1000 gallons.

A second conveyor 80 is configured to lift solids including shreds of the recyclables and the receptacles from the sump, wherein residual water runs from the solids back to the sump to produce dewatered solids. In particular embodiments, conveyor 80 includes an inclined auger screw such as a dual floating screw dewatering system that pulls the scrap contents, e.g., metal, fabric, and cardboard scraps, up and out of the sump 70 along an inclined trough while allowing the water/hydrolysate to return to the sump tank. The hydrolysate may then be removed from the sump for hazardous waste disposal/recycling.

Second conveyor 80 feeds the dewatered solids/scrap contents to a receiving box 90, from which the contents may be optionally fed to an incinerator, kiln or oven 110. Incinerator 110 may be provided with a conventional off-gas treatment system(s) operating at a temperature adequate to destroy any chemical constituents to effectively burn any remaining chemical residue and shreds of the receptacles 12, to leave metal suitable for metal scrap recycling. In particular embodiments, incinerator 110 includes a rotary reactor incinerator configured to operate at a minimum temperature of about 1000 F. In particular embodiments, the dewatered solids are fed by conveyor 80 to receiving box 90 where they may be stored and/or tested for chemical content pending introduction into the kiln or oven 110. If testing shows that the scrap is inert and non-detonable, then the scrap will be recycled without thermal processing with kiln 110.

Apparatus 5 may include one or more variable speed drives 92 operatively engaged with the first conveyor and/or the second conveyor, and optionally, with feed valve 30 and shredder(s) 60, 62. A processor, such as a conventional PLC 100 is communicably coupled to the conveyors 20, 80 and the shredders 60, 62, including the variable speed drive(s) 92, to control operation of the apparatus 5, such as to programmably control feed rates and timing of the various components 20, 80, 60, 62, etc. For example, the processor 100 is configured to actuate a variable speed drive 92 of the first conveyor 20 to provide a controlled feed rate of one receptacle 12 every 20 to 30 seconds.

Processor 100 may also be programmed to provide for cascading equipment shut downs in the event of a jam or fire, as discussed hereinbelow. For example, apparatus 5 may include an electromagnetic detector 102 (e.g., an ultra violet/infrared (UV/IR) detector) disposed within shred stack 26, e.g., to detect flames, and/or to provide optical information to an operator. Shred stack 26 may also include a hinged access door (not shown) within the closed chute extending between the primary shredder 60 and the secondary shredder 62, to provide an operator with access to clear jams. At least one pressure sensor 104 may also be disposed in shred stack 26, e.g., in shredder(s) 60, 62, with both detectors 102 and 104 communicably coupled via the processor 100 to the various components including the shredder(s) and conveyors and irrigation means 52, 52' and spray 50. The processor is thus configured to alter operation of the apparatus in the event of a jam detected by the pressure sensor, and/or to increase water flow by sprayers 50, 52, in the event of a flame. The processor may be configured to pause operation of components upstream of the jam until the jam is cleared, to reverse and then restart shredding x times before stopping operation of the apparatus, and/or to signal an operator of a jam. Sensor 102 may also serve as a camera to enable a user to view operation of the apparatus remotely.

A method for rendering inert and separating components of detonable devices fabricated from metal and water soluble chemical explosive propellants, for recycling, for example using a version of the apparatus 5 shown and described hereinabove, will now be described as illustrated in the following Table I. As shown in Table I, the method 200 commences with receiving 210, with feeder 10, material including a plurality of the detonable devices. With first conveyor 20, the material is fed 212 from the feeder to the upstream portion of shred tower 26 at a controlled feed rate. The material is then conveyed 214 in a downstream direction through shred tower 26, via feed valve 30, which is selectively actuated at 216 between open and closed positions to respectively permit and prevent the material from entering the upstream portion of the hopper. Water is supplied 218 to hopper 40 via irrigation means 52, 52', to substantially prevent sparking and to begin to solubilize and separate the chemicals from the metal during operation of the primary shredder and/or the optional secondary shredder. Shredder 60 shreds the material at 220, and optional secondary shredder performs a finer shred of the material at 222. The water sump 70 receives 224 the material from the secondary shredder to continue to solubilize and separate the chemicals from the metal. The second conveyor 80 lifts 226 the solids including shreds of the metal from sump, wherein residual water runs from the solids back to the sump to produce dewatered solids. The second conveyor 80 then feeds 228 the dewatered solids to a receiving box for metal scrap recycling.

TABLE I

Method 200

| | |
|---|---|
| 210 | feeder receives material including detonable devices |
| 212 | material fed from the feeder to upstream portion of shred tower 26 |
| 214 | material conveyed in a downstream direction through shred tower 26 |
| 216 | feed valve 30 selectively actuated between open and closed positions |
| 218 | water supplied to hopper 40 via irrigation means 52, 52' |
| 220 | Shredder 60 shreds the material |
| 222 | secondary shredder optionally performs a finer shred of the material |
| 224 | sump 70 receives material from the secondary shredder |
| 226 | second conveyor 80 lifts the solids including shreds of the metal from sump |
| 228 | second conveyor feeds the dewatered solids to a receiving box for metal scrap recycling |

Figure 2:
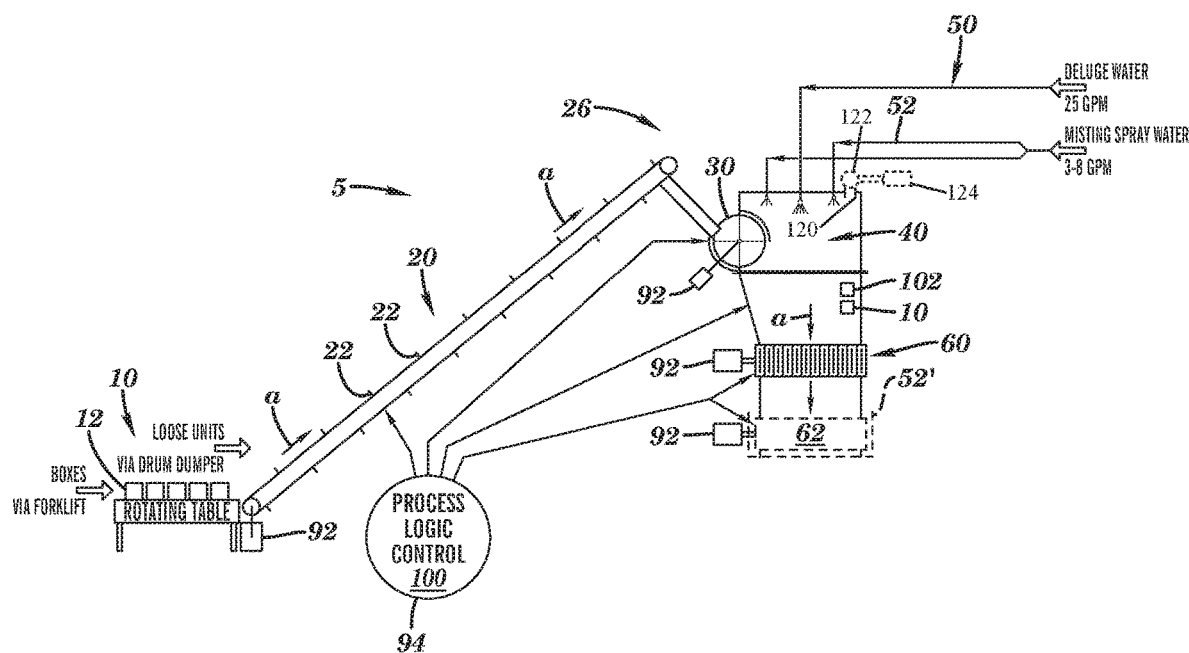
FIG. 2 is a schematic representation of an alternate embodiment of the present invention, including optional variations thereof.

Although the foregoing description is directed towards automotive air bag inflators, those skilled in the art should recognize that the exemplary apparatus and method described herein may be applied to render any number of low level detonatable devices inert for recycling, such as, for example, aerosol cans. Those skilled in the art will recognize that conventional aerosol cans use a chemical propellant such as compressed gas (e.g. nitrogen, nitrous oxide or carbon dioxide) or a liquefied gas (e.g. butane, isobutane, propane) to propel a product (e.g., paint, cooking oil, lubricants, hair spray, etc.). Even after they have been emptied of their products, such 'empty' cans often still contain chemical propellant. These empty aerosol cans may thus be considered to be detonable devices, particularly when the chemical propellants are flammable, such as the aforementioned butane, isobutane or propane, etc. Even cans containing non-flammable chemical propellants such as nitrogen, nitrous oxide or carbon dioxide may be considered detonable/explosive when placed under pressure in compactors and the like during conventional disposal operations. Moreover, although gases such as butane and other alkanes are generally considered to have low solubility in water, those skilled in the art will recognize that water solubility of butane and the like is not zero, and may be considerably increased by decreasing the temperature of the water. Accordingly, these 'empty' aerosol cans may thus be considered to be detonable devices fabricated from metal and water soluble chemical explosive propellants, for which processing using the embodiments hereof may be desirable. Indeed, while any of the foregoing embodiments may be used substantially as shown and described hereinabove to process aerosol cans, embodiments that may be particularly useful for handling aerosol cans with propellants of relatively low water solubility, may include the aforementioned fan 122, which draws gases in the upstream direction out of vent 120 and feeds the withdrawn gases to thermal destruction device and/or carbon bed 124 for pollution control. Moreover, as shown in FIG. 2, it should be recognized that any of the embodiments shown and described herein may be used with or without the sump 70, second conveyor 80, receiving box 90, and/or incinerator 110, without departing from the scope of the present invention.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means" or "step" are explicitly used in the particular claim.

Having thus described the invention, what is claimed is:

1. An apparatus for rendering inert and separating components of detonable devices fabricated from metal and water soluble chemical explosive propellants, for recycling, the apparatus comprising:
   a feeder configured to receive material including a plurality of the detonable devices;
   a shred tower configured to convey the material in a downstream direction therethrough, the shred tower including a hopper, at least one shredder disposed within and/or downstream of the hopper;
   a first conveyor operatively engaged with the feeder and the shred tower, the first conveyor configured to feed the material from the feeder to an upstream portion of the hopper at a controlled feed rate;
   a feed valve disposed at the upstream portion of the hopper, the feed valve being selectively actuatable between open and closed positions to respectively permit and prevent the material from entering the upstream portion of the hopper; and an irrigation means to substantially prevent sparking and to begin to solubilize and separate the chemicals from the metal during operation of the at least one shredder.

2. The apparatus of claim 1, further comprising a vent at an upstream portion of the shred tower, a fan configured to withdraw gases in the upstream direction out of the vent, and an emissions control device configured to receive the withdrawn gases.

3. The apparatus of claim 1, wherein the at least one shredder comprises a primary shredder and a secondary shredder, the primary shredder configured to perform a course shred of the material, and the secondary shredder configured to receive the material from the primary shredder, and to perform a fine shred of the material.

4. The apparatus of claim 3, comprising a closed chute extending between the primary shredder and the secondary shredder, the closed chute having a hinged access to permit user access to clear jams.

5. The apparatus of claim 4, further comprising at least one pressure sensor operatively engaged with at least one of the primary shredder and secondary shredder, the at least one pressure sensor communicably coupled to a processor, the processor communicably coupled to the first conveyor, the secondary conveyor, the primary shredder, and the secondary shredder, the processor configured to alter operation of the apparatus in the event of a jam detected by the at least one pressure sensor.

6. The apparatus of claim 5, wherein the processor is configured to pause operation of components upstream of the jam until the jam is cleared.

7. The apparatus of claim 5, wherein the processor is further configured to reverse and then restart shredding x times before stopping operation of the apparatus and signaling an operator of a jam.

8. The apparatus of claim 1, wherein the irrigation means comprises a set of misting water spray nozzles configured to spray water onto the at least one shredder, and/or a bath containing the at least one shredder therein.

9. The apparatus of claim 8, further comprising flame detector connected to one or more deluge water spray nozzles communicably coupled to said flame detector for activation upon detection of a flame, the deluge water spray nozzles configured to supply a high volume of water relative to the set of misting water spray nozzles.

10. The apparatus of claim 9, wherein the flame detector comprises a UV/IR flame detector.

11. The apparatus of claim 1, wherein the water soluble chemical explosive propellants are selected from the group consisting of ammonium nitrate, nitroguanidine, nitrogen, nitrous oxide, carbon dioxide, butane, isobutane, propane, and combinations thereof.

12. The apparatus of claim 11, wherein the detonable devices comprise charged air bag inflators and/or aerosol cans.

13. The apparatus of claim 12, wherein the charged air bag inflators comprise cylindrical metallic air bag inflators and puck shaped metallic air bag inflators.

14. The apparatus of claim 1, further comprising a water sump disposed downstream of the at least one shredder, the water sump configured to receive the material from the at least one shredder to continue to solubilize and separate the chemicals from the metal.

15. The apparatus of claim 14, further comprising a second conveyor configured to lift solids including shreds of the metal from the sump, wherein residual water runs from the solids back to the sump to produce dewatered solids, the second conveyor configured to feed the dewatered solids to a receiver for metal scrap recycling.

16. The apparatus of claim 15, further comprising one or more variable speed drives operatively engaged with the first conveyor and/or the second conveyor.

17. The apparatus of claim 16, wherein the first conveyor comprises a cleated inclined conveyor belt.

18. The apparatus of claim 16, wherein the second conveyor comprises an inclined auger screw.

19. The apparatus of claim 16, wherein the material comprises receptacles containing the plurality of the detonable devices therein.

20. The apparatus of claim 19, wherein the one or more variable speed drives are configured to provide the first conveyor with a controlled feed rate of 20 to 30 seconds per receptacle.

21. The apparatus of claim 19, wherein the receptacles include cardboard boxes.

22. The apparatus of claim 21, wherein the primary shredder includes relatively widely pitched teeth to tear open the cardboard boxes, and the secondary shredder includes relatively finely spaced teeth.

23. The apparatus of claim 1, wherein the hopper is closed in 360 degrees about the downstream direction and is constructed of metallic plate of at least ⅜ inches thick.

24. The apparatus of claim 1, wherein the feed valve comprises a rotary feed valve.

25. The apparatus of claim 24, wherein the feed valve is disposed in the closed position during operation of the primary shredder and/or the secondary shredder to substantially prevent the material from exiting the hopper via the upstream portion thereof during said shredding.

26. The apparatus of claim 1, wherein the water sump has a capacity of at least about 500 gallons up to about 1000 gallons.

27. The apparatus of claim 1, wherein the incinerator comprises a rotary reactor incinerator configured to operate at a minimum temperature of about 1000 F.

28. The apparatus of claim 1, further comprising a camera configured to enable a user to view operation of the apparatus remotely.

29. The apparatus of claim 1, further comprising an incinerator configured to receive the metal from the receiving box to burn any remaining chemical residue prior to recycling.

30. An apparatus for rendering inert detonable devices such as charged air bag inflators and/or aerosol cans for recycling, the apparatus comprising:
    a feeder configured to receive cardboard boxes including a plurality of detonable devices;
    a shred tower and a cleated inclined conveyor belt with a variable speed drive configured to bring the boxes from the feeder to a top of the shred tower at a controlled feed rate of 20 to 30 seconds per box;
    a first feed hopper at the top of the shred tower;
    a primary shredder disposed within the hopper;
    a rotary feed valve disposed within the hopper and configured to receive the boxes from the conveyor belt and to feed the boxes to the primary shredder for shredding;
    the rotary feed valve configured to close the shredder after receipt of the boxes therein to substantially prevent metallic shards from escaping during said shredding;

the hopper being closed on all sides and constructed of metallic plate and including a hinged perforated metallic plate cover;

the hopper including continuous water spray nozzles aimed at shredder teeth to substantially prevent sparking and to wash chemicals from the detonable devices;

the primary shredder having relatively widely pitched teeth to tear open the boxes;

a secondary shredder disposed below the primary shredder and configured to receive the torn boxes and contents therefrom;

the secondary shredder having relatively finely spaced teeth;

the hopper including a CCTV camera to view operation remotely, and a UV/IR flame detector connected to a secondary water deluge nozzle to be activated upon detection of a flame;

a closed chute between the two shredders with a hinged side access door above the secondary shredder to clear jams;

the shredders including pressure sensors configured to stop the units if a jam occurs, to auto-reverse, and then restart shredding x times before signaling an operator of a jam; and a programmable logic controller (PLC) configured to operate the conveyor belt, the primary and secondary shredders, and configured to pause operation of components upstream of the jam until cleared;

wherein the apparatus provides a low speed dual stacked hydraulic shredding operation to open the detonable devices under a continuous water spray and expose contents thereof to a water bath to solubilize it and separate it from metallic components.

31. The apparatus of claim 30, further comprising a water sump of 500 to 1000 gallon capacity disposed below the secondary shredder, and equipped with a high capacity pump feeding to a storage tank.

32. The apparatus of claim 31, further comprising a dual inclined auger screw configured to lift solids including metal and cardboard scraps from sump, wherein residual water runs from the solids back to the sump.

33. The apparatus of claim 32, wherein the auger screw is configured to feed the dewatered metal solids to a rotary reactor incinerator feed pit operating at a minimum 1000 F temperature to destroy any remaining chemical residue and cardboard from box shredding, to leave metal suitable for shipping to metal scrap recyclers.

34. A method for rendering inert and separating components of detonable devices fabricated from metal and water soluble chemical explosive propellants, for recycling, the method comprising:

(a) receiving, with a feeder, material including a plurality of the detonable devices;

(b) conveying the material in a downstream direction through a shred tower including a hopper, at least one shredder disposed within and/or downstream of the hopper;

(c) feeding, with a first conveyor operatively engaged with the feeder and the shred tower, the material from the feeder to an upstream portion of the hopper at a controlled feed rate;

(d) selectively actuating a feed valve disposed at the upstream portion of the hopper, between open and closed positions to respectively permit and prevent the material from entering the upstream portion of the hopper;

(e) irrigating with irrigation means, to substantially prevent sparking and to begin to solubilize and separate the chemicals from the metal during operation of the at least one shredder; and (f) shredding the material with the at least one shredder.

35. The method of claim 34, further comprising withdrawing gases in the upstream direction out of a vent disposed at an upstream portion of the shred tower, and receiving the withdrawn gases at an emissions control device.

36. The method of claim 34, further comprising receiving material from the at least one shredder in a water sump disposed downstream of the at least one shredder, to continue to solubilize and separate the chemicals from the metal.

37. The apparatus of claim 36, further comprising lifting solids including shreds of the metal from the sump with a second conveyor, wherein residual water runs from the solids back to the sump to produce dewatered solids, to feed the dewatered solids to a receiver for metal scrap recycling.

38. The method of claim 34, wherein the at least one shredder comprises a primary shredder and a secondary shredder, and said shredding (f) further comprises using the primary shredder to perform a course shred of the material, and using the secondary shredder to receive the material from the primary shredder, and to perform a fine shred of the material.

39. The apparatus of claim 34, wherein the irrigation means comprises a set of misting water spray nozzles configured to spray water onto the at least one shredder, and/or a bath containing the at least one shredder therein.

* * * * *